United States Patent [19]

Furuto

[11] 3,982,636

[45] Sept. 28, 1976

[54] CAR LIFTING APPARATUS

[76] Inventor: Seiji Furuto, 865, Suzukicho 2-chome, Kodaira, Tokyo, Japan

[22] Filed: July 17, 1975

[21] Appl. No.: 596,659

[30] Foreign Application Priority Data

July 26, 1974 Japan ................................ 49-85692
Apr. 2, 1975 Japan ................................ 50-40139

[52] U.S. Cl. ................................ 214/1 A; 214/332; 269/60

[51] Int. Cl.[2] ........................ B23Q 3/18; B66F 3/08

[58] Field of Search .............. 214/1 A, 332; 269/56, 269/58-62

[56] References Cited

UNITED STATES PATENTS 1,500,284 7/1924 Stubbs ............................ 214/1 A X
3,252,590 5/1966 Nielsen .............................. 214/1 A

FOREIGN PATENTS OR APPLICATIONS 661,558 11/1951 United Kingdom ................. 214/1 A

*Primary Examiner*—Robert S. Ward, Jr.

[57] ABSTRACT

A car lifting apparatus for the maintenance of cars adapted to lift one side of a car higher than the other side and maintain the car at any inclined angle so that the car falls sideways. It has a carrier to hold a car thereon. One end of the carrier is connected to a main lifting means, while the other end is connected through an auxiliary lifting means to a truck. After operation of the auxiliary lifting means, operation of the main lifting means causes one end of the carrier to lift up, so that the other end thereof is drawn near. The car on the carrier is held there by means of a pair of support pad means which engage both sides of the car.

8 Claims, 8 Drawing Figures

CAR LIFTING APPARATUS

This invention relates to a car lifting apparatus for the maintenance of cars and more particularly to a car lifting apparatus adapted to lift one side of a car higher than the other side and maintain the car so that it falls sideways.

In the case of a motor-operated hydraulic car jack having a lifting ramp, the car on the ramp is vertically moved as it is in a running or horizontal state. With such well-known hydraulic jack, however, maintenance of a car requires that the operator should stand up or sit down under the car and that he should look upwards and stretch his arm to the lower portion of the chassis to perform necessary operations. This leads to the disadvantages that the operator is exposed to dirty matters dropping from the car such as water, oil and mud and that he is forced to assume a posture which would cause a considerable fatigue. In addition, installation of such hydraulic jack requires the provision of a pit, and thus the work for digging the pit is needed. Such hydraulic jack is further disadvantageous in that it cannot be used as a portable type.

Accordingly, it is an object of this invention to provide a car lifting apparatus adapted to carry a car so that the car falls sideways in order to allow the operator to look the lower portion of the car almost in a cross direction in the maintenance work of such portion.

Another object of this invention is to provide a portable car lifting apparatus which, if desired, can be installed any place without the need for the installation work.

According to this invention, there can be provided a car lifting apparatus capable of carrying a car so that the car falls almost sideways by supporting the lower portions on both sides of the car and lifting one side higher than the other side. According such car lifting apparatus, the lower portion of a car is exposed before the operator's eyes, it being scarcely covered, and so the operator can effect the work for maintenance with ease and that without fatigue and without dirt such as water and oil dropping from the car.

The car lifting apparatus according to this invention comprises carrier means carrying a car thereon and having a support member which engages the car, lifting means for lifting one end of said carrier means upward, connection means for connecting one end of said carrier means with said lifting means, guide means for guiding the other end of said carrier means in the direction of said lifting means as the latter moves, and means for drivingly connecting the other end of said carrier means with said guide means. The said support member includes a pair of pad means which fit the lower portions on both sides of a car. Such pad means are disposed so that the spacing therebetween can be adjusted to allow the apparatus to be utilizable for various kinds of cars of different widths. The means for drivingly connecting the other end of said carrier means with said guide means may include an auxiliary lifting means which lifts the other end of the carrier in advance of the operation of the lifting means. Such an auxiliary lifting means is useful in that when the other end of the carrier means carrying a car thereon is guided toward the lifting means as the latter operates, there can be eliminated the trouble caused by the dragging of tyre on the ground.

The above and further objects and features and advantages of this invention will more appear from the following detailed description when the same is read in connection with the accompanying drawings which illustrate an embodiment of the invention, in which.

Figure 1:
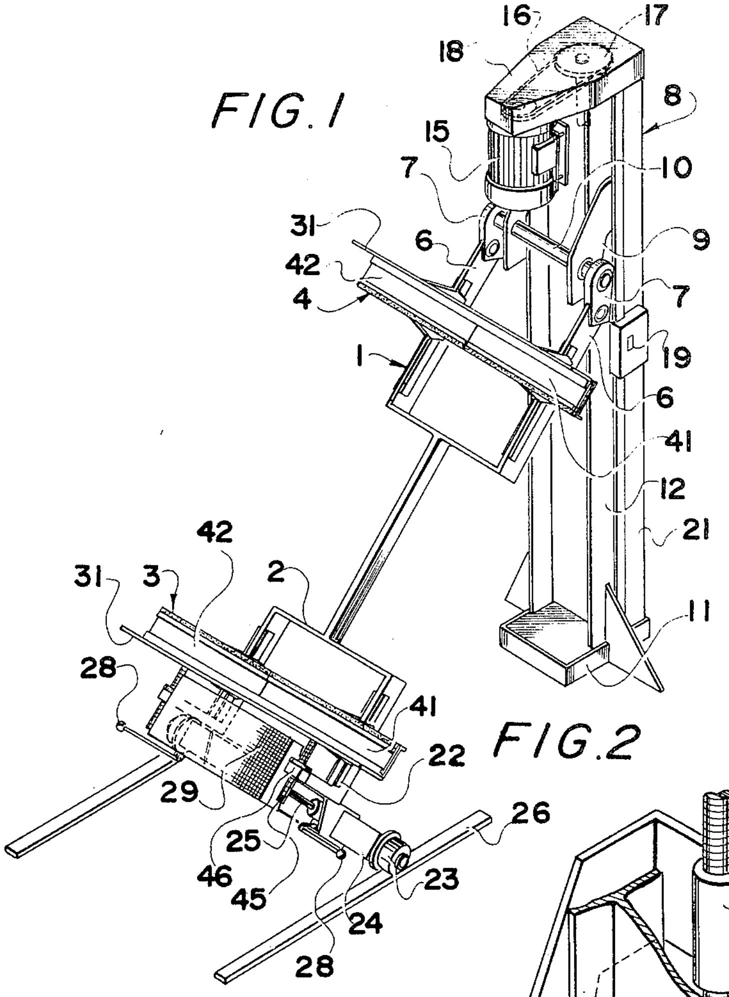
FIG. 1 is a perspective view of the car lifting apparatus according to this invention.
Figure 2:
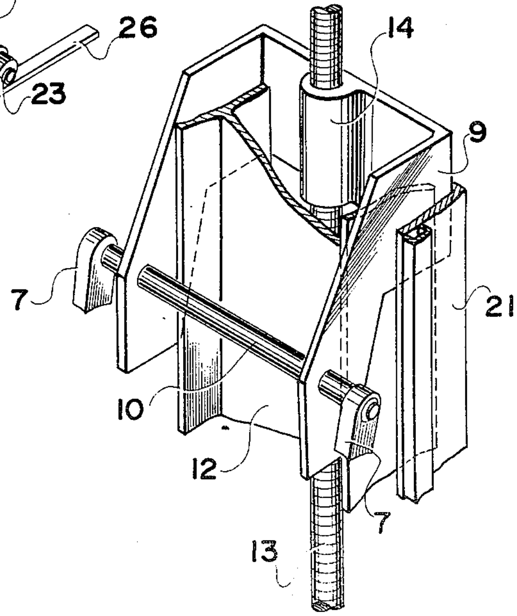
FIG. 2 is a perspective view of the main lifting means illustrated in FIG. 1, parts being broken away for explanation.

In FIG. 1 there is shown the state of the car lifting apparatus of the invention which is in one position of operation. The apparatus is provided with a carrier 1 adapted to move between a horizontal inoperative position and an operative position having any inclined angle. The carrier 1 is composed, for example, of the framework 2 as here shown, on which it has a pair of support pad means 3 and 4. From FIG. 5 it will be apparent that the pair of support pad means 3 and 4 support the lower portions on both sides of a car 5. On this regard, however, a detailed explanation will be given hereinafter. The carrier 1 has one end 6 which is connected to a link 7, with the link 7 being connected through a pivot 10 to a movable bracket 9 of a main lifting means 8. The movable bracket 9 has a boss 14 engaging a screw rod 13 which is mounted along a self-standing strut 12, the strut 12 including a base 11. The bracket 9 moves up and down along the strut 12 as the screw rod 13 rotates. The screw rod 13, which is carried in thrust bearings though not shown, has at its upper portion a pulley 17 belted over 16 a reversible motor 15. The motor 15 is attached to a plate 18 which is located at the upper portion of the strut 12. It starts rotation in a desired direction upon operation of a switch 19 which is attached to the central portion of the strut 12. As the screw rod 13 rotates, the movable bracket 9 moves along the strut 12 from the lower inoperative position thereof toward the upper operative position, and to ensure such operation it engages the strut 12. As shown in FIG. 2, a shell 21 may be provided along the strut 12 so that the bracket 9 is disposed between the shell 21 and the strut 12.

Figure 3:
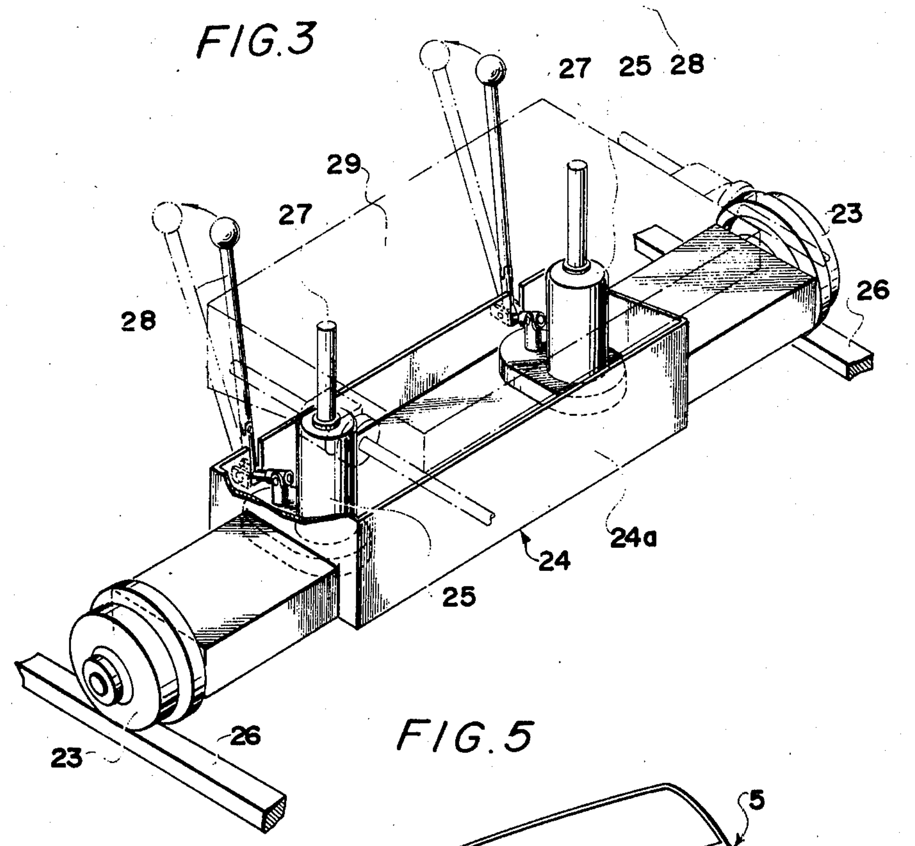
FIG. 3 is a perspective view of the guide means and the auxiliary lifting means illustrated in FIG. 1.
Figure 5:
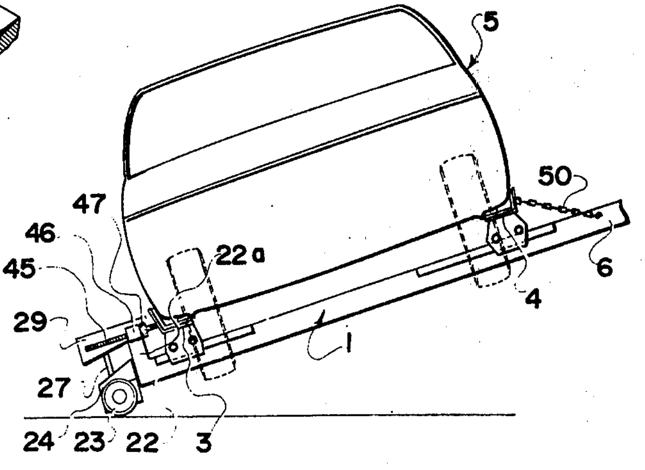
FIG. 5 is a side view diagrammatically showing the condition in which the support member shown in FIG. 4 is in actual use.
Figure 6A:
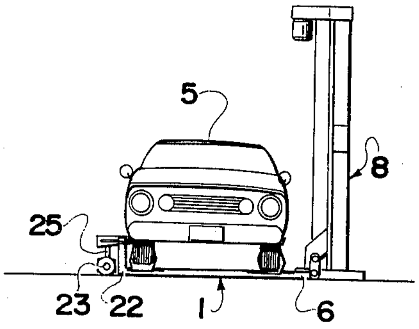
FIGS. 6*a* through 6*c* are side views showing the condition in which the car lifting apparatus of this invention is in actual use.
Figure 6B:
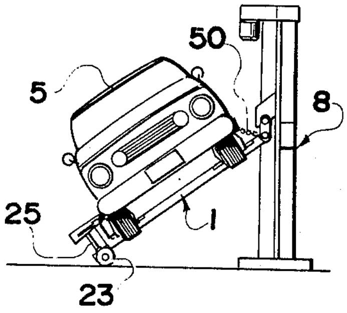

When one end 6 of the carrier is lifted up by the main lifting means 8, the other end 22 thereof is drawn in the direction of the main lifting means 8. The reference numeral 24 is a guide truck having a pair of wheels 23. On the guide truck 24 there is mounted an auxiliary lifting means 25, through which the guide truck 24 is connected to the other end 22 of the carrier 1. Thus the other end 22 of the carrier 1 is guided by the pair of wheels 23, the wheels 23 bearing the load applied to the other end 22 of the carrier 1. As is apparent from FIG. 3, the auxiliary lifting means 25 may be a pair of hand-operating hydraulic jack. Detailed reference to such hand-operating hydraulic jack is omitted here because it is well-known, but it has a piston rod 27 adapted to move upward or downward according to a repeated operation of a handle 28. The piston rod 27 is, according to this embodiment, adapted to lift up a lift cap 29 connected integrally to a bar 22*a* which stands up from the other end 22 of the carrier 1. It should be noted that in this case the bar 22*a* is in a slidably contact relation with the side wall 24*a* of the guide truck 24 (FIG. 5). The auxiliary lifting means 25, reference to whose operation will be fully described hereinbelow in connection with the explanation of FIG. 6, is used with a view to slightly lifting up the other end 22 of the carrier 1 from the inoperative position before such end is drawn toward the main lifting means 8 as the latter operates.

Figure 4:
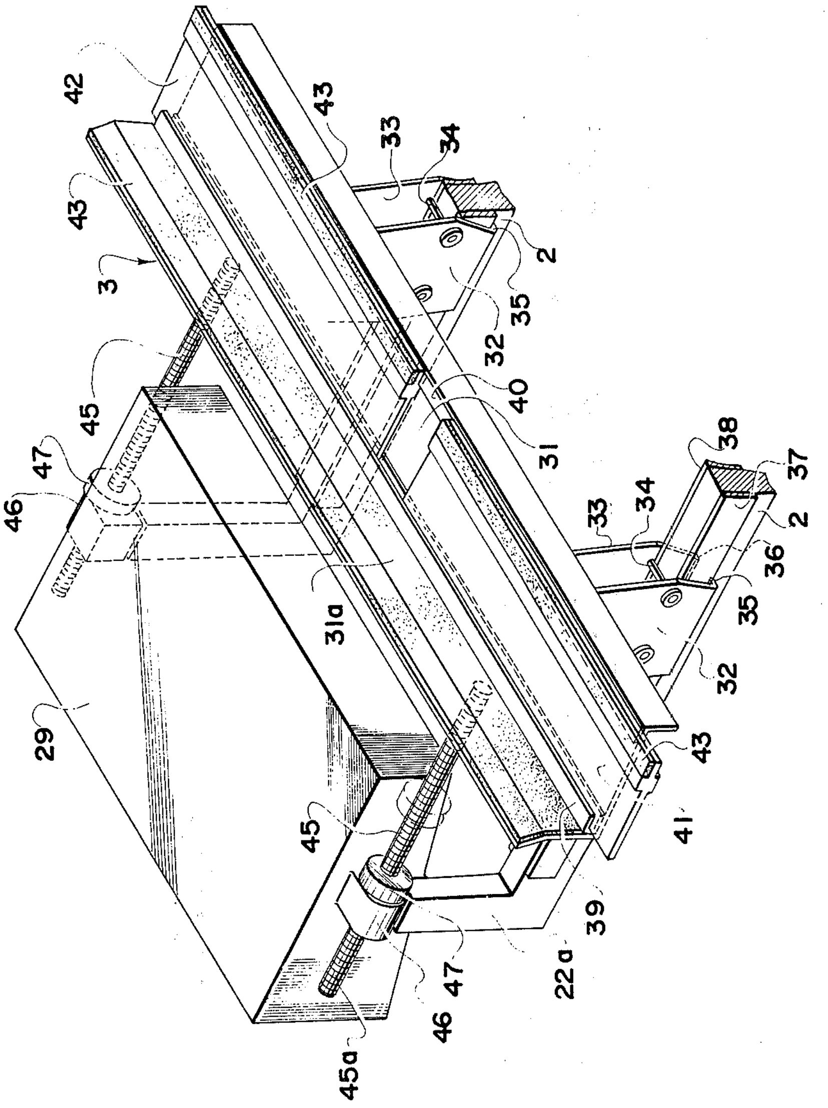
FIG. 4 is a perspective view diagrammatically showing the carrier means and the support member shown in FIG. 1.

FIG. 4 fully illustrates one of the pair of support pad means 3 and 4 shown in FIG. 1. Such one support pad means 3 has a beam 31 of a generally L-shaped section extending over the two parallel frameworks 2 of the carrier 1. The beam 31 includes two bracket pairs 32 and 33 at its lower portions, the bracket pairs 32 and being in an operative connection with the respective corresponding frameworks. They are connected together by means of a pin 34. At the ends of the bracket pairs 32 and 33 there are formed opposed pawls 35 and 36 which engage stopper bars 37 and 38 respectively attached on both sides of the framework 2, while the pin 34 is on the framework 2, whereby the bracket pairs 32 and 33 can slide on the framework 2 without coming off the framework. At the corner of the beam 31 there is provided a channel bar 39, while at the side edge thereof opposed to the opening of the channel bar 39 there is mounted a rail 40, both extending in the direction of the length of beam 31. On the beam 31, moreover, there are disposed a pair of movable pads 41 and 42 which are slidably guided by the channel bar 39 and rail 40. In this case, the side edge of one of the movable pads 41 and 42 merely contacts the upper portion of the rail 40, but in operation the pads operate so that the load of a car is forced against the framework 2. Each movable pad projects from the end portion of the beam 31 and is thus helpful in increasing the substantial length of the beam. The surface of the stand-up portion 31*a* of the beam 31 and that of the pair of movable pads 41, 42 may be covered with a buffer plate 43 composed of for example a soft synthetic resin.

The hereinbefore made explanation on one support pad means 3 may be applied, completely in the same way, to the other support pad means 4, detailed description on which is therefore omitted. As the parts corresponding to one support pad means 3 are indicated with the same reference numerals in FIG. 1, an easy understanding will be available. However, what should be noted is that one support pad means 3 and the other support pad means 4 both are slidable in the direction of the length of the framework 2, but that the former pad means is provided with a screw rod 45. The screw rod 45 extends rearward from the back of the stand-up portion 31*a* of beam 31, with the end portion 45*a* thereof passing through a boss 46 formed in the lift cap 29 which is connected integrally with the other end 22 of the framework 2. The boss 46 and the screw rod 45 are not screw engaged, thus allowing the latter to pass freely through the hole of the latter. Between the boss 46 and the beam 31 there is threaded a lock nut 47. As a result, the rearward movement of the beam 31 is restricted by the collision of the lock nut 47 on screw rod 45 with the boss 46. The term "rearward" used in connection with the direction of movement of beam 31 means the right top direction in FIG. 4, in other words, the direction contrary to the strut 12 when looked from the beam 31. The position of the beam 31 on the framework 2 can be varied by adjustment of the lock nut 47 on screw rod 45, and thus at a fixed position the beam 31 is in a locked condition with respect the rearward direction.

Figure 6C:
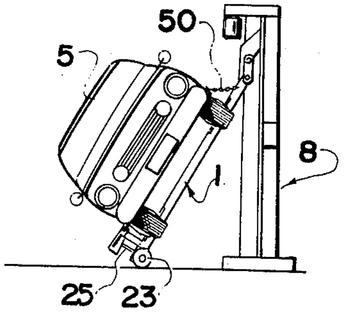

In the car lifting apparatus of this invention, the carrier 1 extends, in usual state, almost horizontally on the surface of the site for installation. To ensure such position of the carrier 1, the inoperative positions of the lifting means 8 and auxiliary lifting means 25 are determined. In operation, the car 5 is positioned onto the carrier 1, and then the position of the pair of support pad means 3 and 4 is adjusted so that they fit the lower portions on both sides of the car 5. In this case, in one support pad means 3, adjustment is effected with respect to the position of the lock nut 47 on screw rod 45 connected to the beam 31, while, in the other support pad means 4, what should be done is only to slide the beam 31 with respect to the framework 2 to which it is in operative relation. In conducting the car 5 onto the carrier 1, it is desirable to effect such conduction so that the center in the longitudinal direction of the car 5 is positioned just on the carrier 1, but a slight slipping-off would cause almost no trouble. Because, the support pad means 3, 4 are provided with the pair of movable pads 41, 42 adapted to move along the beam 31 and thus the slipping-off in position of the car 5 can be compensated by these movable pads 41 and 42. The latter pads allows application of the apparatus to various kinds of cars of different lengths. Following the set up of the pair of support pad means 3, 4, the auxiliary lifting means 25 connected to the other end 22 of carrier 1 is actuated. As a result, the other end 22 of carrier 1 is lifted up with one end 6 thereof made as a fulcrum, so that one support pad means 3 on the carrier 1 engages the lower portion of the car 5 and one side of the car 5 is thereby lifted up. (FIG. 6*a*) The lift up of the carrier 1 by means of the auxiliary lifting means 25 may be to the extent that the tyres on one side of the car 5 is slightly away from the surface of the site of installation. In this condition, the other support pad means 4 also engages the lower portion on the other side of the car 5. The function of the auxiliary lifting means 25 will be evident upon observation of the operation of the main lifting means 8, which operation is done following the actuation of the auxiliary lifting means. The main lifting means 8 not only lifts up one end 6 of the carrier 1 upward, but also draws the other end 22 thereof toward the strut 12. (FIG. 6*b*) As the other end 22 of the carrier 1 is connected through the auxiliary lifting means 25 to the guide truck 24 which has the wheel 23, the travelling of the wheel 23 on a rail 26 mounted on the surface of the site of installation allows the other end 22 of carrier 1 to move smoothly along the strut 12. In this case, unless one support pad means 3 engages the car 5 so that the load of the latter is fully borne by the carrier 1, the tyre on one side of the car will be dragged on the surface of the site of installation and hence the other end 22 of carrier 1 will not move smoothly. Such a drawback, however, can be completely eliminated by the car lifting apparatus of this invention, that is, by such operation of the auxiliary lifting means 25 as mentioned above. This auxiliary lifting means 25, in cooperation with the main lifting means 8, can satisfy the requirement such that a car should be lifted up only to a slight extend while its running posture is maintained, for example, in changing tyre. As the operation of the lifting means 8 advances, the carrier forms a larger inclined angle, and the ratio of load applied to one support pad means 3 becomes higher due to the component of force of the load of the car carried on the carrier 1. The beam 31 is brought into connection with the screw rod 45 and the lock nut 47, which is threaded to the screw rod 45, collides with the boss 46 formed in the lift plate 29 which corresponds to the other end 22 of carrier 1. Consequently, the load applied to one support pad means 3 is borne by the lift cap 29, but the latter is connected integrally with the bar 22*a* which stands up from the end 22 of carrier 1; the bar 22*a* slidably contacts the side wall portion 24*a* of the guide truck 24 and the load is therefore borne by the wheel 23 of the guide truck 24. That is, the load applied to the lift cap 29 is borne by the wheel 23 without applying bending stress to the piston rod 27 of the auxiliary lifting means 25. According to the car lifting apparatus of this invention, the carrier, that is, the car 5 can be held at an inclined angle of about 60° at the final operating position of the lifting means 8 (FIG. 6*c*). Even at such a large inclined angle, the car can be kept stationary merely by placing the lower portions on both sides of the car on the pair of support pad means 3 and 4 without rigidly attaching it on the carrier 1. This is one of the great advantages of this invention. If importance is attached to safety, however, a chain 50 fixed to one end of carrier 1 (FIG. 5) may be connected for example to the chassis of the car.

In the hereinbefore described embodiment, the carrier 1 extends, in usual state, horizontally on the surface of the site of installation. Therefore, when the car is to be conducted onto the carrier 1 in operation, either of the front and rear wheels must pass over the carrier. But this causes almost no trouble, because there can be provided a suitable footstool (not shown) on the admission passage of the car. In some cases, there may be formed a groove in the surface of the site of installation so that the groove fits the carrier 1, that is, the latter fits in the former in usual state. By so doing, the carrier 1 and the surface of the site of installation form a flat plane. Detailed descriptions of the specified embodiment of the car lifting apparatus of this invention are as set forth hereinbefore, but it is to be understood that such specified embodiment is for purpose of illustration only and the invention is not restricted thereto, that is, changes and modifications may be made. Such changes and modifications may be, for example, such that the lifting means 8 does not include the strut 12 and it is a well-known hoist or crane attached to the ceiling of some structure at the site of installation.

Having described the invention, what is claimed is;

1. A car lifting apparatus comprising means for carrying a car thereon and having a support member which engages the car, means for lifting one end of said carrier means upward, means for connecting said one end of said carrier with said lifting means, means for guiding the other end of said carrier means in the direction of said lifting means as the latter operates, and means for connecting said other end of said carrier means with said guide means, said latter connecting means including auxiliary lifting means lifting said other end of said carrier means upward.

2. A car lifting apparatus as claimed in claim 1 wherein said support member includes a pair of support pad means mounted near both ends of said carrier means respectively, said support pad means being slidable toward each other so that they fit the lower portions on both sides of a car respectively, one of said support pad means mounted near the other end of said carrier means having means for locking the operating position thereof.

3. A car lifting apparatus as claimed in claim 1 wherein said lifting means lifts said one end of said carrier means in a vertical direction.

4. A car lifting apparatus as claimed in claim 3 wherein said lifting means comprises a vertically extending strut, a screw rod mounted along said strut, drive means for rotating said screw rod, and a movable bracket with which said screw rod is threadedly engaged, said movable bracket moving along said strut as the screw rod rotates and being in an operative connection with said one end of said carrier means.

5. A car lifting apparatus as claimed in claim 4 wherein said strut has a base at its lower portion, said base serving to keep said strut in self-stand-up condition.

6. A car lifting apparatus as claimed in claim 1 wherein said guide means comprises a guide truck having wheels.

7. A car lifting apparatus as claimed in claim 1 wherein said auxiliary lifting means comprises a hand-operated hydraulic jack.

8. A car lifting apparatus as claimed in claim 1 wherein said means for connecting the other end of said carrier means with said guide means comprises an auxiliary lifting means mounted on said guide means, a member connected operatively with said auxiliary lifting means, and a bar connecting said member integrally with said other end of said carrier means and extending from said other end of said carrier means at an angle almost normal thereto, said bar slidable contacting said guide means whereby when said one end of said carrier means has been lifted up, the load applied to said other end of said carrier means is transmitted directly to said guide means.

* * * * *